(12) United States Patent
Wedig

(10) Patent No.: US 12,374,015 B2
(45) Date of Patent: Jul. 29, 2025

(54) FACIAL CAPTURE ARTIFICIAL INTELLIGENCE FOR TRAINING MODELS

(71) Applicant: Sony Interactive Entertainment LLC, San Mateo, CA (US)

(72) Inventor: Geoff Wedig, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 222 days.

(21) Appl. No.: 17/711,893

(22) Filed: Apr. 1, 2022

(65) Prior Publication Data
US 2022/0319088 A1     Oct. 6, 2022

Related U.S. Application Data

(60) Provisional application No. 63/170,334, filed on Apr. 2, 2021.

(51) Int. Cl.
*G06T 13/40*     (2011.01)
*A63F 13/57*     (2014.01)
(Continued)

(52) U.S. Cl.
CPC .............. *G06T 13/40* (2013.01); *A63F 13/57* (2014.09); *G06T 17/20* (2013.01); *G06V 10/774* (2022.01);
(Continued)

(58) Field of Classification Search
None
See application file for complete search history.

(56) References Cited

U.S. PATENT DOCUMENTS 8,581,911 B2    11/2013    Becker et al.
8,648,866 B2    2/2014     Ting et al.
(Continued)

FOREIGN PATENT DOCUMENTS

CN    109903368 A    6/2019
CN    109978984 A    7/2019
(Continued)

OTHER PUBLICATIONS

Cho et al., "FaceWarehouse: A 3D Facial Expression Database for Visual Computing" (Year: 2014).*
(Continued)

*Primary Examiner* — Hilina K Demeter
(74) *Attorney, Agent, or Firm* — Fish & Richardson P.C.

(57) ABSTRACT

Methods and systems are provided for training a model using a simulated character for animating a facial expression of a game character. The method includes generating facial expressions of the simulated character using input label value files (iLVFs). The method includes capturing mesh data of the simulated character using a virtual camera to generate three-dimensional (3D) depth data of a face of the simulated character. In one embodiment, the 3D depth data being output as mesh files corresponding to frames captured by the virtual camera. The method includes processing the iLVFs and the mesh data to train the model. In one embodiment, the model is configured to receive input mesh files from a human actor to generate output label value files (oLVFs) that are used for animating the facial expression of the game character. In this way, a real human actor is not required for training the model.

22 Claims, 8 Drawing Sheets

(51) Int. Cl.
*G06T 17/20* (2006.01)
*G06V 10/774* (2022.01)
*G06V 40/16* (2022.01)

(52) U.S. Cl.
CPC .......... *G06V 40/168* (2022.01); *G06V 40/172* (2022.01); *G06V 40/174* (2022.01)

(56) References Cited

U.S. PATENT DOCUMENTS

| | | | |
|---|---|---|---|
| 9,196,074 B1* | 11/2015 | Bhat | G06T 17/20 |
| 10,860,838 B1* | 12/2020 | Elahie | A63F 13/655 |
| 12,165,247 B2 | 12/2024 | Wedig | |
| 2010/0141663 A1 | 6/2010 | Becker et al. | |
| 2011/0141105 A1 | 6/2011 | Ting et al. | |
| 2014/0210831 A1 | 7/2014 | Stenger et al. | |
| 2014/0240324 A1 | 8/2014 | Becker et al. | |
| 2017/0039752 A1 | 2/2017 | Quinn et al. | |
| 2017/0132828 A1* | 5/2017 | Zelenin | A63F 13/63 |
| 2018/0151002 A1* | 5/2018 | Nair | A63F 13/825 |
| 2018/0253593 A1 | 9/2018 | Hu et al. | |
| 2020/0090392 A1 | 3/2020 | Chou et al. | |
| 2020/0286301 A1* | 9/2020 | Loper | G06T 7/80 |
| 2021/0012549 A1 | 1/2021 | Comer et al. | |
| 2021/0012550 A1 | 1/2021 | Orvalho et al. | |
| 2021/0097730 A1* | 4/2021 | Theobald | G06N 3/088 |
| 2021/0360199 A1* | 11/2021 | Oz | H04N 7/147 |
| 2022/0005248 A1* | 1/2022 | Choi | G06V 40/166 |

FOREIGN PATENT DOCUMENTS

| | | |
|---|---|---|
| CN | 111325846 A | 6/2020 |
| CN | 112232310 A | 1/2021 |
| JP | 2014-146340 A | 8/2014 |
| TW | 201123074 A | 7/2011 |
| TW | 202013242 A | 4/2020 |

OTHER PUBLICATIONS

Berson et al., "A Robust Interactive Facial Animation Editing System", (Year: 2019).*

PCT/US2022/022953, Notification of Transmittal of the International Search Report and the Written Opinion of the International Searching Authority, or the Declaration, PCT/ISA/220, and the International Search Report, PCT/ISA/210, Jul. 15, 2022.

Zhang et al., "Facial Expression Retargeting from Human to Avatar Made Easy", XP055803981, IEEE Transactions on Visualization and Computer Graphics 1, Aug. 12, 2020. https://arxiv.org/pdf/2008.05110.pdf.

Blanco et al., "Facial Retargeting with Automatic Range of Motion Alignment", XP058372928, ACM Transactions on Graphics, NY, vol. 36, No. 4, Jul. 20, 2017, ISSN: 0730-031, DOI: 10.1145/3072959.3073674.

TW111112263, Translation of the Notice, Case No. 894311, Taiwan IPO Search Report, Nov. 1, 2022.

Danelakis et al., "Action unit detection in 3D facial videos with application in facial expression retrieval and recognition," Multimedia Tools and Application, Klumer Academic Pub., Mar. 28, 2019, 77(19):J4813-24841 (abstract only).

International Preliminary Report on Patentability in International Appln. No. PCT/US2022/022953, mailed on Oct. 3, 2023, 9 pages.

Perakis et al., "Feature fusion for facial landmark detection," Pattern Recognition, Mar. 20, 2014, 47(9):2783-2793.

Zhang et al., "BP4D-Spontaneous: a high-resolution spontaneous 3D dynamic facial expression database," Image and Vision Computing, Oct. 1, 2014, 32(10):692-706 (abstract only).

* cited by examiner

Label Value File Table 400

| Input Mesh File ID 402 | Output LVF ID 404 | Emotion 406 | Description 408 | Facial Feature 1 | Facial Feature 2 | Facial Feature 3 | Facial Feature 4 | Facial Feature 5 | Facial Feature 6 | Facial Feature 7 | Facial Feature 8 | Facial Feature 9 | ... | Facial Feature N |
|---|---|---|---|---|---|---|---|---|---|---|---|---|---|---|
| IMF-1 | OLVF-1 | Anger | Eyebrows down and together; eyes glare; narrowing of lips | 0.2 | 0.3 | 0.6 | 1.0 | 0.4 | 0.8 | 0.8 | 0.9 | 0.8 | | 0.2 |
| IMF-2 | OLVF-2 | Fear | Eyebrows raised; raised upper eyelid; tense lower eyelids; lips slightly stretched | 0.7 | 0.4 | 0.1 | 0.0 | 1.0 | 0.6 | 0.3 | 0.4 | 0.5 | | 0.3 |
| IMF-3 | OLVF-3 | Sadness | Drooping upper eyelids; loosing focus in eyes; slight pull down of lip corners | 0.4 | 0.3 | 0.8 | 0.7 | 0.7 | 0.2 | 0.9 | 0.8 | 0.8 | | 0.5 |
| IMF-4 | OLVF-4 | Contempt | Lip corner tightened and raised on only one side of face | 0.5 | 0.6 | 1.0 | 0.4 | 0.9 | 0.7 | 0.6 | 0.6 | 0.9 | | 0.1 |
| IMF-5 | OLVF-5 | Disgust | Nose wrinkling; upper lip raised | 0.2 | 0.0 | 0.4 | 0.1 | 0.9 | 0.5 | 0.6 | 0.9 | 0.5 | | 0.7 |
| ... | ... | ... | ... | | | | | | | | | | | |
| IMF-n | OLVF-n | Surprise | Eyebrows raised; eyes widened; mouth open | 0.4 | 0.7 | 0.5 | 0.1 | 0.6 | 0.3 | 0.7 | 0.4 | 0.1 | | 0.7 |

Facial Feature Values 410

Fig. 4

FACIAL CAPTURE ARTIFICIAL INTELLIGENCE FOR TRAINING MODELS

CLAIM OF PRIORITY

This application claims priority under 35 U.S.C. 119(e) to U.S. Provisional Patent Application No. 63/170,334, filed Apr. 2, 2021, the disclosure of which is incorporated herein by reference in its entirety for all purposes.

1. FIELD OF THE DISCLOSURE

The present disclosure relates generally to animating facial expression of game characters, and more particularly to methods and systems for training a model using a simulated character for animating a facial expression of a game character.

Background

2. DESCRIPTION OF THE RELATED ART

The video game industry has seen many changes over the years. In particular, technology related to facial animation in video games have become more sophisticated over the past several years resulting in game characters appearing more and more realistic. Today, game characters can express mood and emotions like a human face, which results in players feeling more immersed in the game world. To this end, developers have been seeking ways to develop sophisticated operations that would improve the facial animation process which would result in the process being more efficient and less time consuming.

A growing trend in the video game industry is to improve and develop unique ways that will enhance and make the facial animation process of game characters more efficient. Unfortunately, current facial animation processes are expensive, time consuming, and involves precise planning and directing. For example, a facial animation process may involve various contributors (e.g., directors, actors, video production team, designers, animators, etc.) with different skill-sets that contribute to the production of animating game characters. Current facial animation process may be extremely time consuming and expensive. In particular, a video production team and a real human actor may be required to work together to capture the facial expressions of the actor. The real human actor may be required to perform thousands of facial expressions while the video production team ensures that the actor's performance is properly captured. Unfortunately, this process is extremely time-consuming and expensive. As a result, the current process of producing facial animation for game characters can be inefficient which may not be effective in achieving high quality results under tight schedules.

It is in this context that implementations of the disclosure arise.

SUMMARY

Implementations for the present disclosure include methods, systems, and devices relating to training a model using a simulated character for animating a facial expression of a game character. In some embodiments, methods are disclosed to enable generating facial expressions of a simulated character in which the facial expressions of the simulated character are captured by a virtual camera to produce mesh data which are used for training an Artificial Intelligence (AI) model. For example, an expression simulator can be used to generate the facial expressions of the simulated character using input label value files (iLVFs). The input label value iLVFs may correspond to facial expressions such as joy, fear, sadness, anger, surprised etc. which can be used instruct the simulated character to generate the facial expressions.

In one embodiment, the facial expressions of the simulated character are captured by a virtual camera to produce mesh data which is processed to train the model. In some embodiments, the mesh data may be processed in time coordination with the iLVFs to train the model. In one embedment, the model can be configured to receive input files from a human actor (or a face of any person or character) to generate output label value files (oLVFs) that are used for animating the facial expression of the game character. Accordingly, once the model is trained, the methods disclosed herein outline ways of using input mesh files of a human actor in model to generate oLVFs that are used for animating the facial expression of game characters. Thus, instead of requiring a real human actor to produce thousands of facial expressions, actions, and poses, the methods disclosed herein outline ways of training the model using a simulated character where the simulated character is instructed to produce thousands of facial expressions, actions, and poses. In this way, training a model and animating the facial expressions of game characters can be done quickly and efficiently without the need of using a human actor to train the model.

In one embodiment, a method for training a model using a simulated character for animating a facial expression of a game character is provided. The method includes generating facial expressions of the simulated character using input label value files (iLVFs). The method includes capturing mesh data of the simulated character using a virtual camera to generate three-dimensional (3D) depth data of a face of the simulated character. In one embodiment, the 3D depth data being output as mesh files corresponding to frames captured by the virtual camera. The method includes processing the iLVFs and the mesh data to train the model. In one embodiment, the model is configured to receive input mesh files from a human actor to generate output label value files (oLVFs) that are used for animating the facial expression of the game character. In this way, a real human actor is not required for training the model.

In another embodiment, a method for generating label values for facial expressions of a game character using three-dimensional (3D) image capture is provided. The method includes accessing a model that is trained using inputs captured associated with a simulated character. In one embodiment, the inputs captured include input label value files (iLVFs) that are used to generate facial expressions of the simulated character. In another embodiment, the inputs further include mesh data of a face of the simulated character, the mesh data representing three-dimensional (3D) depth data of the face. In one embodiment, the model is trained by processing the iLVFs and the mesh data. The method includes capturing mesh files that include mesh data of a face of a human actor, the mesh files being provided as input queries to the model to request label value files (LVFs) that correspond to respective ones of the captured mesh files. In one embodiment, the LVFs are usable by a game engine to animate the facial expressions of the game character presented in a game processed by the game engine.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 4 illustrates an embodiment of a LVF table illustrating various output LVFs that are generated by the model using input mesh files captured from an actor, in accordance with an implementation of the disclosure.

DETAILED DESCRIPTION

Figure 1:
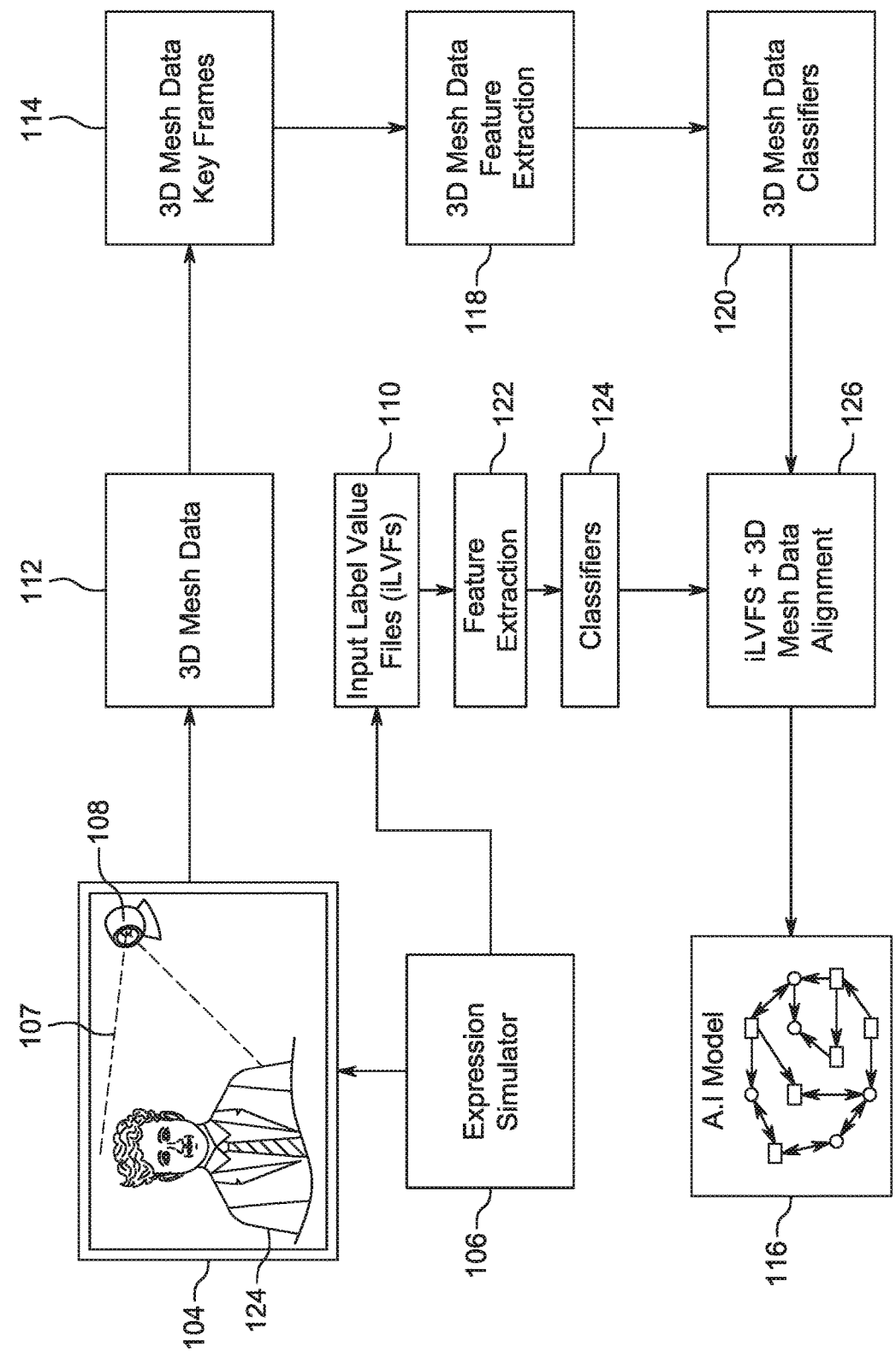
FIG. 1 illustrates an embodiment of a system for training an Artificial Intelligence (AI) model using a simulated character, in accordance with an implementation of the disclosure.

The following implementations of the present disclosure provide methods, systems, and devices for training an Artificial Intelligence (AI) model using a simulated character for animating a facial expression of a game character. By way of example, in one embodiment, the simulated character is instructed to generate different facial expressions using input value files (iLVFs). As the simulated character generates the different facial expressions, a virtual camera is configured to capture mesh data of the simulated character. In some embodiments, the captured mesh data and the iLVFs are processed to train the model. In one embodiment, after the model is trained, the model is configured to receive input mesh files from any human actor (or a face of any person or character) to generate output label value files (oLVFs). Accordingly, the generated output oLVFs can be used for animating a facial expression of a game character in a video game.

Thus, training a model using a simulated character instead of a real human actor facilitates an efficient way of animating a facial expression of a game character since a real human actor is not required to produce different facial expressions, actions, poses, and emotions. This eliminates the need of using a real human actor which is time consuming and requires a significant number of resources to ensure sure that the mesh data is properly captured. For example, instead of having an actor and a video production team spending a significant number of hours and days generating and capturing a number of facial expressions and actions of the actor, a simulated character can be used to generate the facial expressions and the mesh data of the simulated character can be captured by a virtual camera. Generally, the methods described herein provides a more efficient way for animating the facial expressions of game characters using a trained model which in turn can reduce overall operating costs and time spent on producing and capturing the facial expressions of a real human actor.

By way of example, a method is disclosed that enables training a model using a simulated character for animating a facial expression of a game character. The method includes generating facial expressions of the simulated character using input label value files (iLVFs). In another embodiment, the method may include capturing mesh data of the simulated character using a virtual camera to generate three-dimensional (3D) depth data of a face of the simulated character. In one example, the 3D depth data is output as mesh files corresponding to frames captured by the virtual camera. In another embodiment, the method may include processing the iLVFs and the mesh data to train the model. In one example, the model is configured to receive input mesh files from a human actor to generate output label value files (oLVFs) that are used for animating the facial expression of the game character. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for training a model using a simulated character for animating a facial expression of a game character in a video game. In one embodiment, the system may include an expression simulator that is configured to use label value files (iLVFs) as input to instruct a simulated character to generate various facial expressions. In some embodiments, as the simulated character generates different facial expressions, a virtual camera is configured to capture mesh data of the simulated character to generate three-dimensional (3D) depth data of the face of the simulated character. In some embodiments, the iLVFs that are used to generate the facial expressions of the simulated character and the captured mesh data are processed to train the model.

In some embodiments, the training of the model may include processing the mesh data in time coordination with the iLVFs such that correspondences between the iLVFs and the mesh data are learned by the model. In one embodiment, after the model is trained, the model is configured to receive input mesh files from a human actor (or a face of any person or character) to generate output label value files (oLVFs) that are used for animating the facial expression of the game character.

With the above overview in mind, the following provides several example figures to facilitate understanding of the example embodiments.

FIG. 1 illustrates an embodiment of a system for training an Artificial Intelligence (AI) model 116 using a simulated character 102. As shown in FIG. 1, in one embodiment, the system may include an expression simulator 106 that is configured to use label values (iLVFs) as input to instruct the simulated character 102 to generate various facial expressions. In one embodiment, one or more virtual cameras 108 are configured to digitally capture the facial expressions of simulated character 102. In some embodiments, 3D mesh data key frames 114 are identified for processing. In one embodiment, the system may include a 3D mesh data feature extraction 118 operation that is configured to identify the features associated with the 3D mesh data and a 3D mesh data classifiers 120 operation that is configured classify the features using one or more classifiers. In other embodiments, the system may include a feature extraction 122 operation that is configured to identify the features associated with the iLVFs 110 and a classifiers 124 operation that is configured classify the features using one or more classifiers. In other embodiments, the system may include an alignment operation 126 that is configured to receive as inputs the classified features from the classifiers 120 operation and the classifiers 124 operation to align the 3D mesh data with the corresponding iLVFs. In some embodiments, the model 116 is trained using the training data (e.g., aligned 3D mesh data with the corresponding iLVFs) from the alignment operation 126. Accordingly, the more training data that is received by the model 116, the more accurate the generated output label value files (oLVFs) and facial animations will be.

In one embodiment, the expression simulator 106 is configured to use iLVFs to instruct the simulated character 102 to generate various facial expressions, facial movements, eye movements, emotions, actions, poses, etc. Generally, iLVFs are labels that that are descriptive of facial expressions, actions, and the state of the muscles on the face of the simulated character. The iLVFs may include information that instructs the simulated character 102 to perform a specific facial expression, action, or to move specific muscles on the face of the simulated character. In other embodiments, the iLVFs may identify specific muscles on the face of the simulated character, the location where the muscles are located, and identify which of the muscles are activated. For example, using a corresponding iLVF, the simulated character 102 may be instructed to make different facial expressions that expresses a state of joy, sadness, fear, anger, surprise, disgust, contempt, panic, etc. In another example, using a corresponding iLVF, the simulated character 102 may be instructed to generate various actions such as breathing, drinking, eating, swallowing, reading, etc. Accordingly, as the simulated character 102 generates various expressions and actions, the virtual cameras 108 is configured to precisely capture and track the movement in the face of the simulated character 102.

In some embodiments, as illustrated in FIG. 1, a display 104 shows the simulated character 102 generating a facial expression in response to instructions from the expression simulator 106. In the illustrated example, iLVFs corresponding to an emotion expressing "contempt" is used to generate the facial expression of the simulated character 102 shown in the display 104, e.g., raised and arched eyebrow, lip corner tightened on one side of the face.

In some embodiments, a virtual camera 108 with a camera point of view (POV) 107 is used to record and capture the simulated character 102 while the simulate character generates various facial expressions. In one embodiment, the virtual camera 108 is a high-resolution camera that is configured to capture three-dimensional (3D) mesh data of the face of the simulated character 102 to generate 3D depth data of the face of the simulated character 102. In one embodiment, the 3D depth data is output as mesh files that correspond to frames captured by the virtual camera 108. In one embodiment, the 3D mesh data 112 may include mesh files that are associated with the structural build of a 3D model of the frames captured by the virtual camera 108. In some embodiments, the 3D mesh data 112 may include mesh files that use reference points in X, Y, and Z geometric coordinates to define the height, width, and depth of the 3D model.

In some embodiments, after the 3D mesh data 112 of the simulated character is captured by the virtual camera 108, 3D mesh data key frames 114 are identified and extracted from the 3D mesh data 112 for processing. In general, only the 3D mesh data key frames 114 rather than all of the frames in the 3D mesh data 112 are processed and analyzed to help save bandwidth and reduce redundancies. In other embodiments, all of the frames in the 3D mesh data 112 including transition frames are processed by the system.

In some embodiments, after the 3D mesh data key frames 114 are identified, the 3D mesh data feature extraction 118 operation is configured to identify and extract various features in the key frames of the 3D mesh data. After the 3D mesh data feature extraction 118 operation processes and identifies the features from the key frames of the 3D mesh data, the 3D mesh data classifiers 120 operation is configured to classify the features using one or more classifiers. In one embodiment, the features are labeled using a classification algorithm for further refining by the AI model 116.

As noted above, iLVFs 110 are labels that are descriptive of the facial expressions and actions of the simulated character. The iLVFs 110 may include information that instructs the simulated character 102 to generate a specific facial expression or action. In some embodiments, the iLVFs 110 may include a plurality of facial feature values. The facial feature values may range between 0-1 and include a total number of values ranging approximately between 50-1500 total values. In some embodiments, the facial feature values represent labels that describe the muscle activity on the face of the simulated character. For example, a facial feature value of '0' may indicate that the muscle associated with the facial feature is completely relaxed. Conversely, a facial feature value of '1' may indicate that the muscle associated with the facial feature is optimally activated.

In some embodiments, a feature extraction 122 operation to is configured to process the iLVFs 110 to identify and extract various features associated with the iLVFs 110. After the feature extraction 122 operation processes and identifies the features from the iLVFs 110, the classifiers 124 operation is configured to classify the features using one or more classifiers. In some embodiments, the features are labeled using a classification algorithm for further refining by the AI model 116.

In some embodiments, the alignment operation 126 is configured to receive as inputs the classified features (e.g., iLVF classified features, 3D mesh classified features). In one embodiment, the alignment operation 126 is configured to align the 3D mesh data with the corresponding iLVFs. For example, the training of the model 116 may include the alignment operation 126 that is configured to associate the 3D mesh data 112 with iLVFs 110 such that correspondences between the iLVFs and the 3D mesh data are learned by the model. Accordingly, once the 3D mesh data 112 is properly correlated with a corresponding iLVFs 110, the data can be used as input into the model 116 for training the model 116.

In some embodiments, the AI model 116 is configured to receive as input the training files (e.g., 3D mesh aligned with iLVF) generated by the alignment operation 126. In another embodiment, other inputs that are not direct inputs or lack of input/feedback, may also be taken as inputs to the model 116. The model 116 may use a machine learning model to predict what the corresponding output LVFs are for a particular input mesh file. In some embodiments, over time, the training files may be used to train the model 116 to identify what is occurring in a given input mesh file.

Figure 2A:
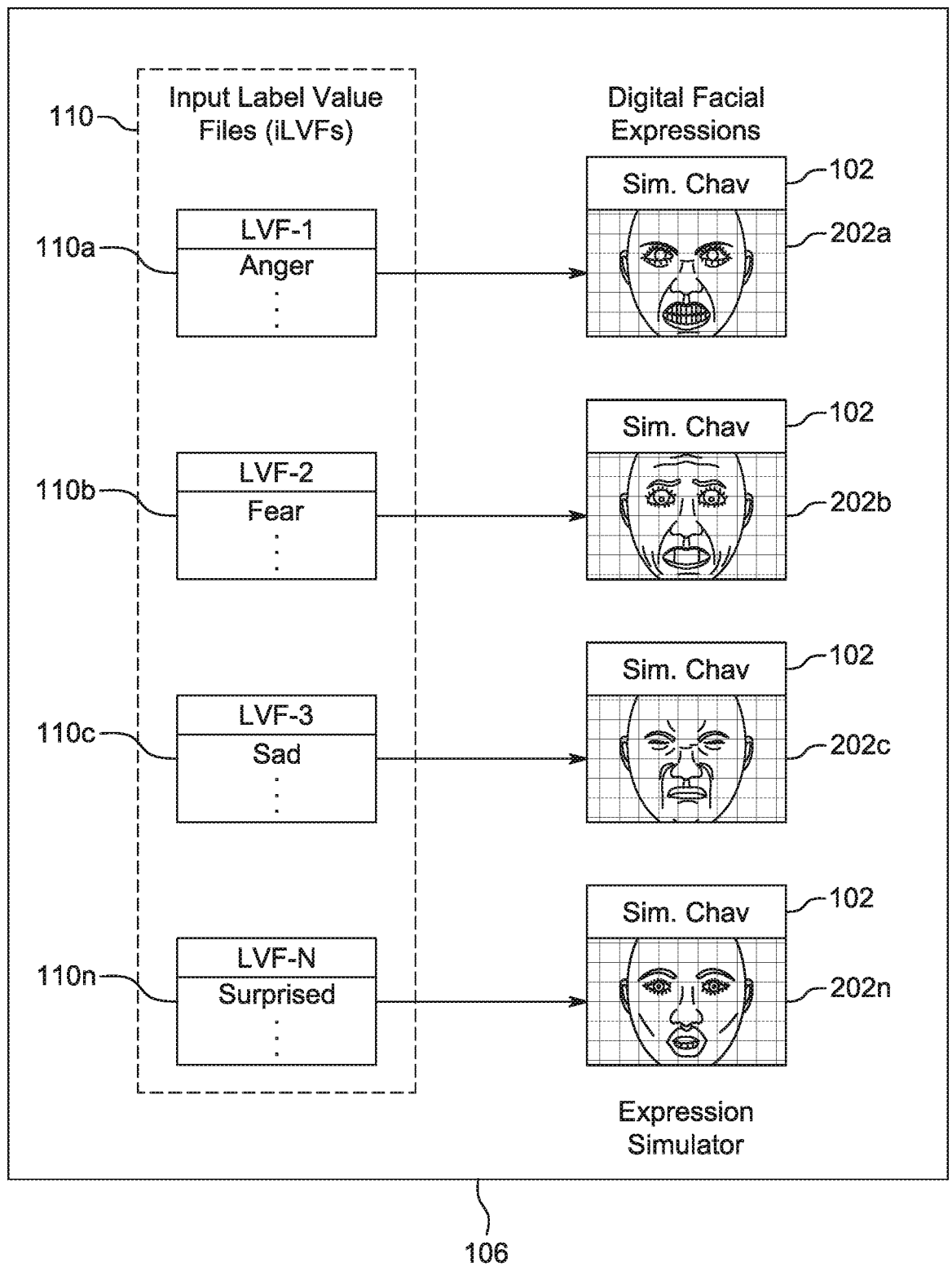
FIG. 2A illustrates an embodiment of an expression simulator that is configured to instruct a simulated character to generate facial expressions using input label value files (iLVFs), in accordance with an implementation of the disclosure.

FIG. 2A illustrates an embodiment of an expression simulator 106 that is configured to instruct a simulated character 102 to generate facial expressions using input label value files (iLVFs) 110. As noted above, the iLVFs 110 are labels that are descriptive of facial expressions, actions, and the state of the muscles on the face of the simulated character. The iLVFs 110 may include information that instructs the simulated character 102 to generate a specific facial expression or action. For example, as illustrated in the example shown in FIG. 2A, the expression simulator 106 is shown receiving and processing iLVFs 110*a*-110*n*. In some embodiments, the expression simulator 106 may be configured to receive and process any combination of iLVFs 110 to instruct the simulated character 102 to generate a desired facial expression or action.

Referring to FIG. 2A, iLVF 110*a* corresponds to an emotion expressing "anger" which is used to instruct the simulated character 102 to generate the "anger" facial expression shown in digital facial expression 202*a*. In another example, iLVF 110*b* corresponds to an emotion expressing "fear" which is used to instruct the simulated character 102 to generate the "fear" facial expression shown in digital facial expression 202*b*. In yet another example, iLVF 110*c* corresponds to an emotion expressing "sad" which is used to instruct the simulated character 102 to generate the "sad" facial expression shown in digital facial expression 202*c*. In another example, iLVF 110*n* corresponds to an emotion expressing "surprised" which is used to instruct the simulated character 102 to generate the "surprised" facial expression shown in digital facial expression 202*n*.

Figure 2B:
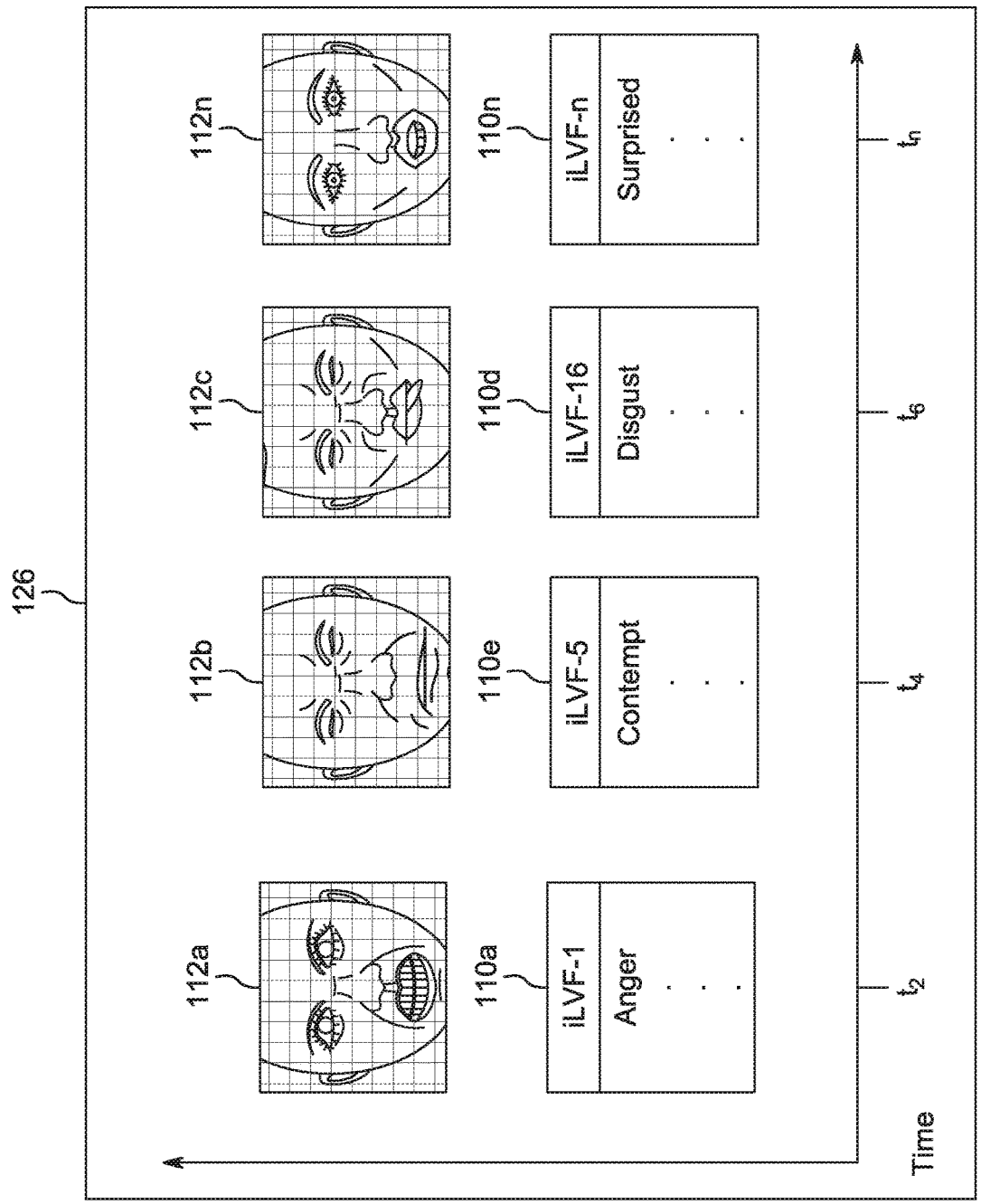
FIG. 2B illustrates an embodiment of the alignment operation that is configured to process the 3D mesh data in time coordination with the iLVFs to train the model, in accordance with an implementation of the disclosure.

FIG. 2B illustrates an embodiment of the alignment operation 126 that is configured to process the 3D mesh data 112 in time coordination with the iLVFs 110 to train the model 116. In one embodiment, the 3D mesh data and the iLVFs are processed in time coordination such that correspondences between the 3D mesh data and the iLVFs are learned by the model 116. As noted above, the 3D mesh data 112 captured by the virtual camera 108 and the iLVFs 110 are used by the expression simulator 106 to instruct the simulated character 102 to generate various facial expressions. In some embodiments, the alignment operation 126 helps train the model so that the model can learn to make accurate correlations between a given mesh data and an iLVF.

For example, as illustrated in FIG. 2B, the alignment operation 126 is shown processing a plurality of 3D mesh files 112*a*-112*n* in time coordination with the iLVFs 110. As time progresses and the alignment operation continues to receive additional mesh files and iLVFs, the alignment operation is configured to analyze and data and ensure that the mesh files and the iLVFs are properly correlated. In one example, mesh file 112*a* is correlated with iLVF 110*a* (e.g., anger) at time t2, mesh file 112*b* is correlated with iLVF 110*e* (e.g., contempt) at time t4, mesh file 112*c* is correlated with iLVF 110*d* (e.g., disgust) at time t6, and mesh file 112*n* is correlated with iLVF 110*n* (e.g., surprised) at time tn. Accordingly, over time the model 132 learns the correspondences between the mesh data and the iLVFs and becomes more accurate and more reliable.

Figure 3:
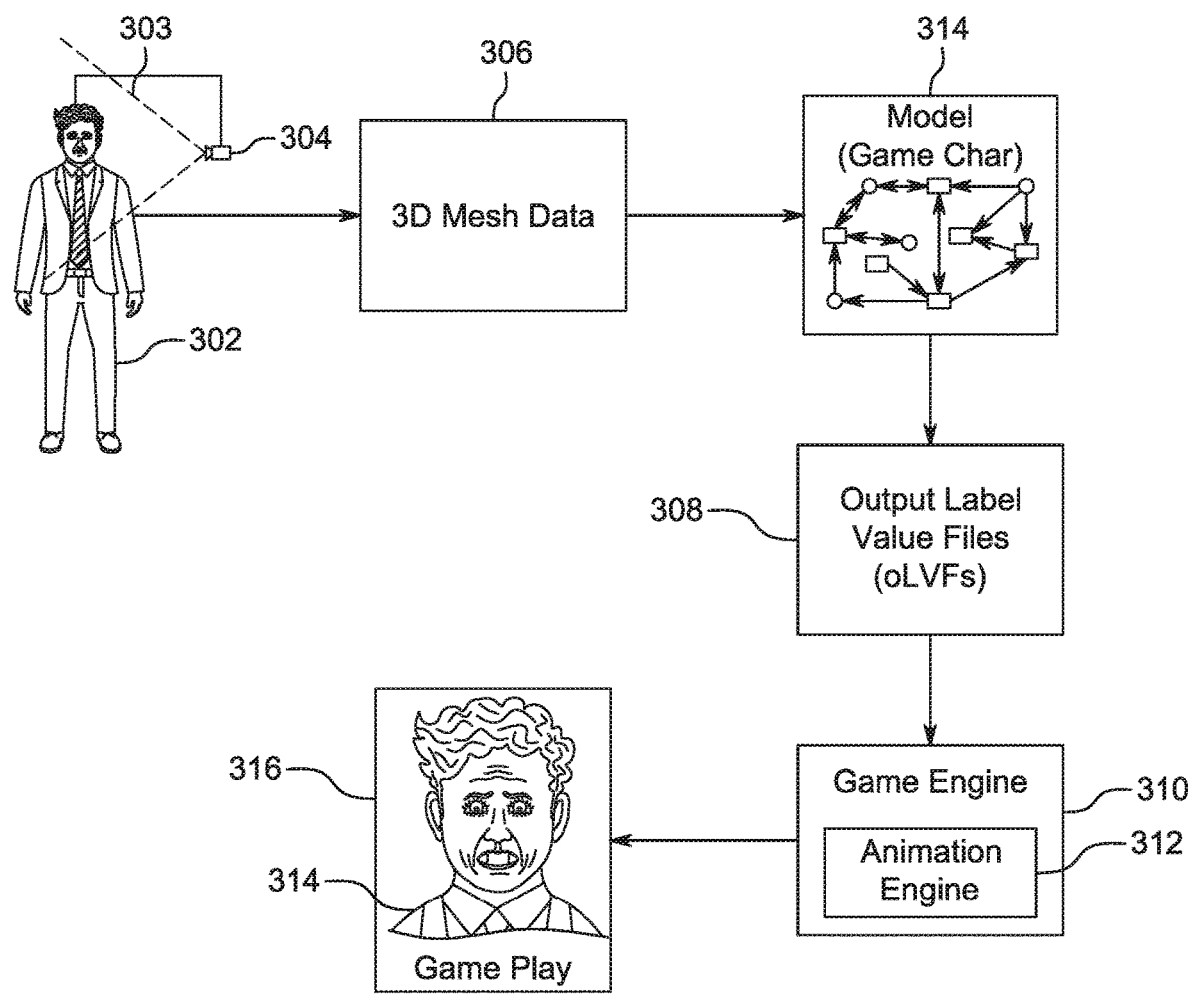
FIG. 3 illustrates an embodiment of a system animating a facial expression of a game character using output LVFs that are generated by a model, in accordance with an implementation of the disclosure.

FIG. 3 illustrates an embodiment of a system animating a facial expression of a game character 314 using output LVFs 308 that are generated by a model 116. As shown in FIG. 3, in one embodiment, the system may include a 3D camera 304 that is configured to capture the facial expressions of an actor 302 to produce 3D mesh data 306. In some embodiments, the 3D mesh data 306 may include input mesh files which can be used as input into the model 116. In one embodiment, the model 116 may be configured to generate output LVFs 308 that are used for animating the facial expression of the game character 314. In some embodiments, the system may include a game engine 310 and animation 312 that are configured to work together to animate the facial expression of the game character 314 using the output LVFs 308. Accordingly, the expressions that are made by the actor 302 can be replicated by the game character 314 in real-time.

In the illustrated example shown in FIG. 3, a real human actor 302 is shown wearing a headset that includes a 3D camera 304 that is configured to capture the facial expressions of the actor 302 to produce 3D mesh data 306. In other embodiments, instead of a face of a real human actor 302, any other face can be used, e.g., avatar, game character, etc. In some embodiments, the actor 302 may be directed to perform various facial expressions, facial movements, eye movements, emotions, actions, poses, etc. which can be captured by the 3D camera 304. For example, the actor 302 may be directed to perform a facial expression that expresses an emotional state of joy, sadness, fear, anger, surprise, disgust, contempt, and panic. In another example, the actor 302 may be asked to perform various actions such as breathing, drinking, eating, swallowing, reading, etc. Accordingly, during the actor's performance, the 3D camera 304 can precisely capture and track the natural muscle movement in the actor's face. In one embodiment, the actor 302 and the game character 314 resembles one another and shares various facial physical characteristics and attributes. In other embodiments, the actor 302 and the game character does not resemble one another nor do they share any facial physical characteristics or attributes.

In one embodiment, the 3D camera 304 may have a camera point of view (POV) 303 that is configured to record and capture the facial expressions of the actor. The 3D camera 304 may be a high-resolution camera that is configured to capture images of the face of the actor 302 to generate 3D depth data of the face of the actor 302. In one embodiment, the 3D depth data is output as mesh files that correspond to frames captured by the 3D camera 304. In one embodiment, the 3D mesh data 306 may include mesh files that are associated with the structural build of a 3D model of the image frames captured by the 3D camera 304. The 3D mesh data 306 may include mesh files that use reference points in X, Y, and Z geometric coordinates to define the height, width, and depth of the 3D model.

In some embodiments, the model 116 is configured to receive input mesh files (e.g., 3D mesh data 306) to generate output LVFs 308. In some embodiments, the model 116 can be trained using training files (e.g., iLVFs, 3D mesh data) associated with a simulated character 102 that resembles the game character 314. This may result in the model granting output LVFs 308 having high accuracy and quality since the model was specifically trained for a specific game character. For example, in the embodiment shown in FIG. 3, the model 116 was trained specifically for game character 314. In other embodiments, the model 116 can be trained using training files associated with a plurality of different simulated characters 102. In some embodiments, each of the simulated characters 102 may be unique and different from one another. For example, each of the simulated characters 102 may have different facial features and physical attributes. Accordingly, the model 116 may include a plurality of models where each of the models is associated with a particular game character in the video game. As a result, depending on which specific game character is to be animated, the corresponding model is configured to generate the appropriate output LVFs for the respective game character.

In some embodiments, the generated output LVFs 308 corresponding to input 3D mesh data 306 can be received by the game engine 310 and animation engine 312 for processing. In some embodiments, the game engine 310 and animation engine 312 may work together to animate the facial expression of the game character 314 or any image such as an avatar. For example, the game character 314 may be an avatar that represents the actor 302. When the actor 302 makes a specific facial expression, the facial expression can be replicated by the avatar. In one embodiment, the animation engine 312 is configured to confirm that the output LVFs are correct and relevant for the game scene. In other embodiments, the game engine 310 is configured to perform an array of functionalities and operations such as executing and rendering the gameplay. In one embodiment, the game engine 310 may use the output LVFs 308 to animate the facial expression of the game character 314. As shown in FIG. 3, display 316 shows the face of the game character 314. In the illustrated example, the output LVFs 308 that is used to animate the game character corresponds to a "happy" emotion. Accordingly, the game character 314 is shown smiling, e.g., cheeks raised, teeth exposed, eyes narrowed.

FIG. 4 illustrates an embodiment of a LVF table 400 illustrating various output LVFs that are generated by the model 116 using input mesh files captured from an actor 302. In one embodiment, the model 116 is configured to receive input mesh files captured from an actor 302 (or a face of any person, avatar, character, etc.) to generate output LVFs corresponding to the input mesh files. As shown, the LVF table 400 includes an input mesh file ID 402 and a corresponding output LVF ID 404. In one embodiment, each of the output LVFs may include an emotion type 406, a description 408 of the emotion, and facial feature values 410 that correspond to various facial features (e.g., Facial Feature 1-Facial Feature N) on the face of the actor 302.

As illustrated in FIG. 4, each generated output LVF may have a corresponding emotion type 406 that classifies the output LVF and a description 408 that describes the features in the corresponding input mesh file. For example, as shown in FIG. 4, input mesh file (e.g., IMF-5) was provided as an input to the model 116 and output LVF (e.g., OLV-5) was generated to correspond to the input mesh file (e.g., IMF-5). As illustrated, output LVF (e.g., OLV-5) includes a facial expression associated with a "disgust" emotion. Further, the description corresponding to output LVF (e.g., OLV-5) includes a brief description of the features of the corresponding input mesh file, e.g., nose wrinkling, upper lip raised.

In some embodiments, each of the output LVFs may include facial feature values 410 that correspond to features on the face of the actor 302 that was used to capture the input mesh files. In one embodiment, the facial feature values 410 associated with the input mesh file may include 50-1500 values. In one example, the values are associated with different muscles on the face of the actor 302. In some embodiments, the facial feature values 410 can range from 0-1. In one embodiment, the facial feature values 410 represent labels that describe the muscle activity on the face present in each input mesh file. For example, a facial feature value of '0' may indicate that the muscle associated with the facial feature is completely relaxed. Conversely, a facial feature value of '1' may indicate that the muscle associated with the facial feature is optimally activated (e.g., as tense as it can be achieved). Accordingly, the more detailed the output LVFs are, the more accurate the animation of the game character will be. The level of detail and the number of values that are provided in the output LVFs may directly affect the quality of the animation of the game character since a higher number of values will generally produce higher quality animations.

To illustrate the facial feature values 410, in one example, as shown in FIG. 4, output LVF (e.g., OLV-2) includes a facial expression associated with an emotion of "fear." The corresponding input mesh file (e.g., IMF-2) includes facial features such as raised eyebrows, raised upper eyelids, and lips stretched. As illustrated, Facial Feature 5 has a value of '1' which corresponds to a point proximate along the eyebrows of the actor. The value of '1' may indicate that the eyebrows of the actor is tense and optimally activated since the muscles within the region are activated such that the eyebrows are raised as far as it can extend. In another example, for output LVF (e.g., OLV-2), Facial Feature 4 has a value of '0' which corresponds to a point proximate to the bridge of the actor's noise. The value of '0' may indicate the bridge of the actor's noise is completely relaxed and inactive.

Figure 5:
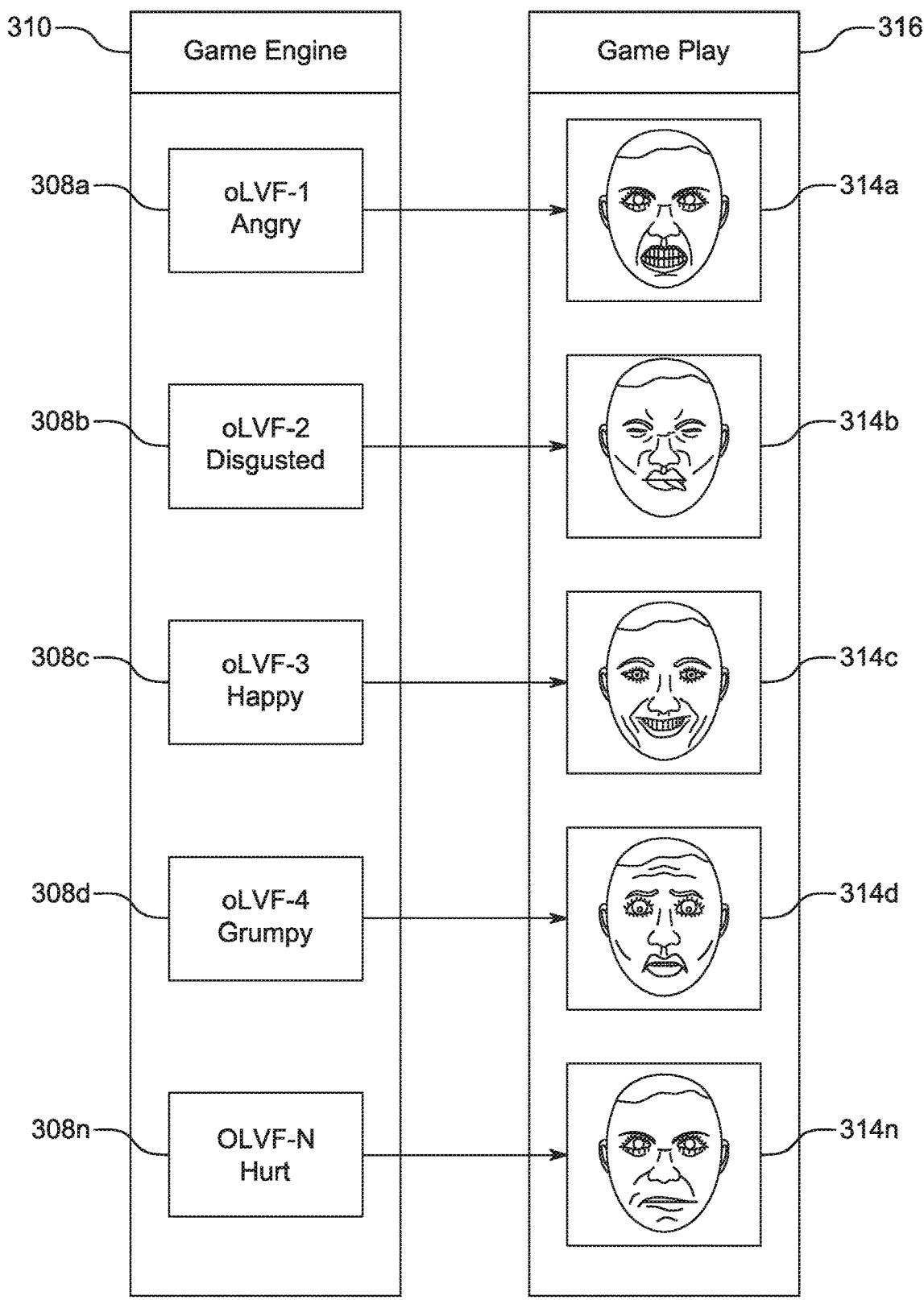
FIG. 5 illustrates an embodiment of a game engine using output label value files to animate the facial expression of a game character, in accordance with an implementation of the disclosure.

FIG. 5 illustrates an embodiment of a game engine 310 using output label value files (oLVFs) 308a-308n to animate the facial expression of a game character 314. As illustrated, the display 316 shows a game character 316 with different facial expressions (e.g., 314a-314n) after being animated by the game engine 310. In one example, oLVF 308a which corresponds to an "angry" facial expression is used to animate the facial expression of the game character. In this example, the animated game character 314a is shown expressing an emotion indicating anger (e.g., eyebrows pulled down, upper eyelids pulled up, margins of lips rolled in).

In another example, oLVF 308b which corresponds to a "disgusted" facial expression is used to animate the facial expression of the game character. In this example, the animated game character 314b is shown expressing an emotion indicating disgust (e.g., tongue sticking out, nose wrinkling, upper lip raised). In yet another example, oLVF 308c which corresponds to an "happy" facial expression is used to animate the facial expression of the game character. In this example, the animated game character 314c is shown expressing an emotion indicating happy (e.g., cheeks raised, lips pulled back, teeth exposed).

In another example, oLVF 308d which corresponds to a "grumpy" facial expression is used to animate the facial expression of the game character. In this example, the animated game character 314d is shown expressing an emotion indicating that the character is grumpy (e.g., lip corner depressed, eyebrow lowered). In yet another example, oLVF 308n which corresponds to a "hurt" facial expression is used to animate the facial expression of the game character. In this example, the animated game character 314n is shown expressing an emotion indicating that the character is hurt (e.g., eyes narrowed, mouth open,).

Figure 6:
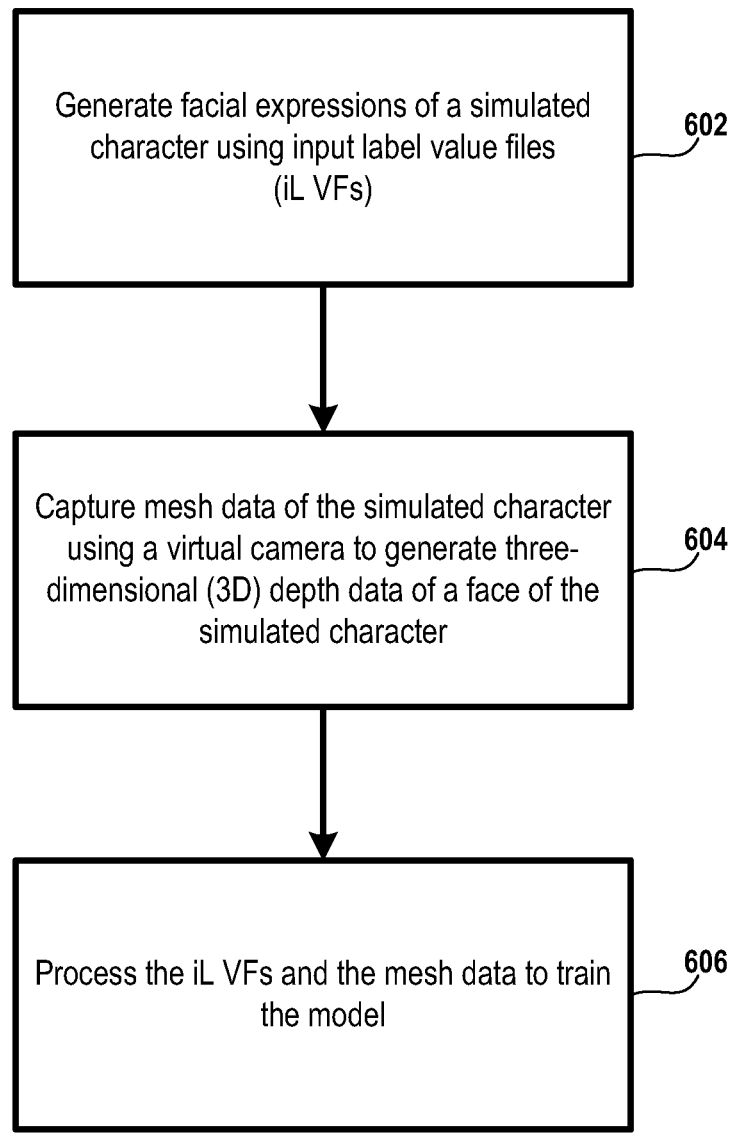
FIG. 6 illustrates a method for training a model using a simulated character for animating a facial expression of a game character, in accordance with an implementation of the disclosure.

FIG. 6 illustrates a method for training a model 116 using a simulated character 102 for animating a facial expression of a game character 314. In one embodiment, the method includes an operation 602 that is configured to generate facial expressions of a simulated character using input label value files (iLVFs) 110. In one embodiment, operation 602 may use an expression simulator 106 that is configured to use the iLVFs 110 to instruct the simulated character 102 to generate various facial expressions, movements, eye movements, emotions, actions, poses, etc. As noted above, the iLVFs 110 are labels that are descriptive of the facial expressions and actions. The iLVFs may include information that instructs the simulated character 102 to generate a specific facial expression or action.

The method shown in FIG. 6 then flows to operation 604 where the operation is configured to capture 3D mesh data 112 of the simulated character 102 using a virtual camera 107 to generate three-dimensional (3D) depth data of a face of the simulated character 102. In some embodiments, the 3D depth data being output as mesh files corresponding to frames captured by the virtual camera. For example, the virtual camera 107 may be in a position that is configured to record and capture the facial expressions of the simulated character 102 as the simulated character generates facial expressions to convey various emotions such as joy, sadness, fear, anger, surprise, disgust, contempt, panic, etc. In one embodiment, the virtual camera 107 is configured to capture and monitor each movement the simulated character makes which can be used to generate the 3D mesh data 112. In some embodiments, the 3D depth data can be used to create a 3D model of the face of the first human actor.

The method shown in FIG. 6 then flows to operation 606 where the operation is configured to process the iLVFs 110 and the mesh data 112 to train the model. In some embodiments, operation 606 is configured to process the mesh data 112 in time coordination with the iLVFs 110. In one embodiment, the operation 606 aligns the mesh data with the corresponding tLVFs such that correspondences between the mesh data and the tLVFs are learned by the model 116. The alignment process helps train the model 116 so that the model 116 can learn to make accurate correlations between a given mesh data and an LVF.

In another embodiment, once the model 116 is trained, the model 116 is configured to receive as input mesh files captured from a real human actor 302 or any other character such as an avatar or game character. Using the input meshes files, the model 116 can be used to generate output LVFs that corresponds to the input mesh files. Accordingly, the trained model 116 can simply use the input mesh files associated with any actor or character to generate output LVFs which can be used to animate a facial expression of a game character.

Figure 7:
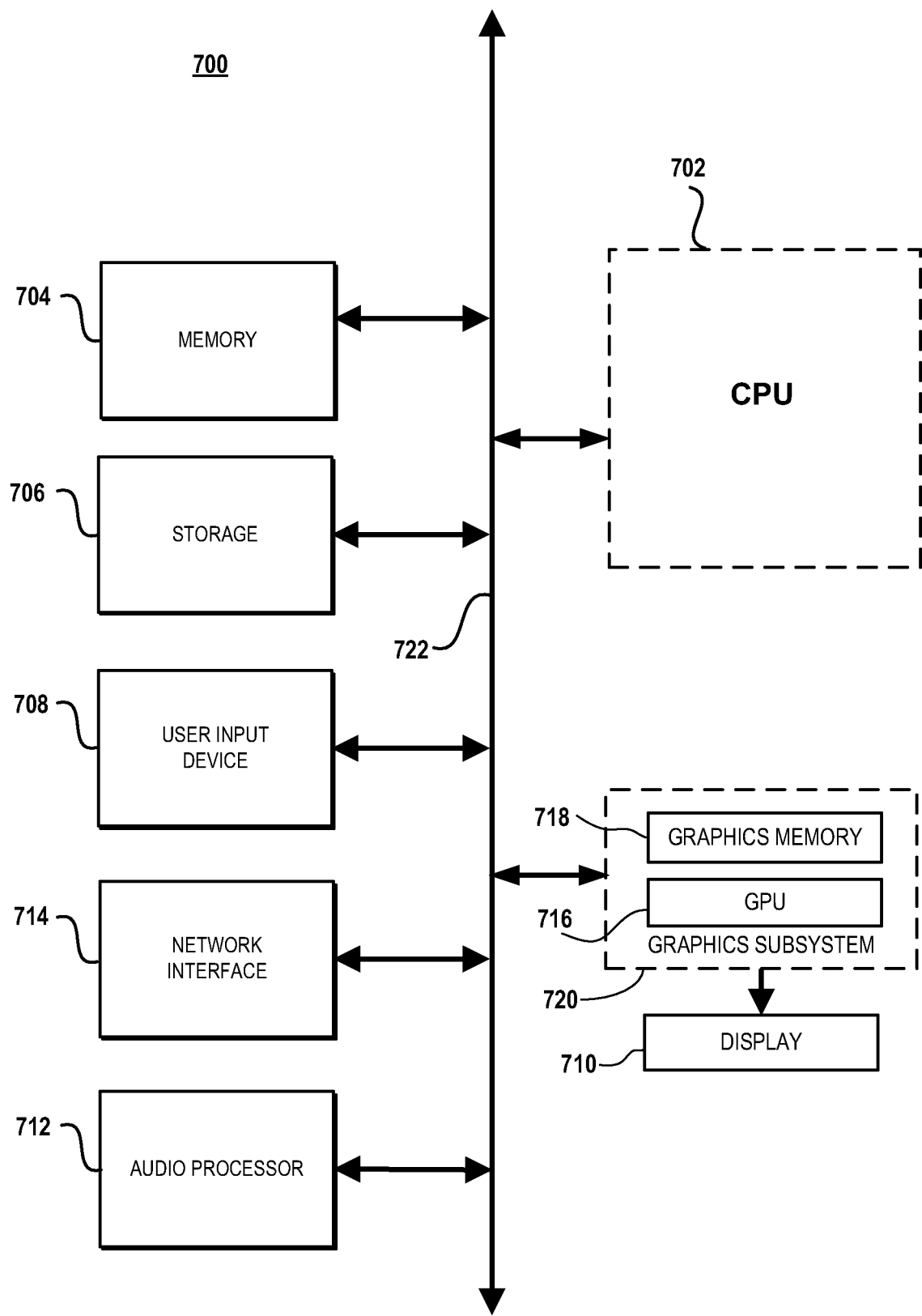
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
instructing multiple simulated characters to generate multiple facial expressions using input label value files (iLVFs), the multiple simulated characters each having different facial features or physical attributes;
for each of the multiple facial expressions of the multiple simulated characters, capturing mesh data of the simulated character using a virtual camera to generate three dimensional (3D) depth data of a face of the simulated character, the 3D depth data being output as mesh files corresponding to frames captured by the virtual camera;
processing the iLVFs and the mesh data to train a model regarding correspondences between the iLVFs and the mesh data for multiple simulated characters; and
generating, by the model, output label file values (oLVFs) for animating a particular facial expression of a game character based on receiving input mesh files for a non-simulated, human actor performing the particular facial expression.

2. The method of claim 1, wherein the mesh data is processed in time coordination with the iLVFs.

3. The method of claim 1, comprising transmitting wherein the OLVFs to a game engine for animating the particular facial expression of the game character.

4. The method of claim 3, wherein the oLVFs are used by the game engine to activate muscles on a face of the game character to generate the facial expressions.

5. The method of claim 1, wherein the iLVFs are used to instruct the simulated character to activate muscles on a face of the simulated character to generate the facial expressions of the simulated characters.

6. The method of claim 1, wherein the mesh data captured by the virtual camera corresponds to the facial expressions generated by the simulated characters.

7. The method of claim 1, wherein the oLVFs includes a plurality of values that correspond to features on a face of the human actor, said plurality of values being used for animating the facial expression of the game character.

8. The method of claim 7, wherein the plurality of values are configured to cause muscle activation in respective areas on a face of the game character.

9. The method of claim 1, wherein key frames are identified from the mesh data, said key frames are processed to train the model.

10. The method of claim 1, wherein the oLVFs include an emotion type, said emotion type is produced by the human actor to generate the input mesh files.

11. The method of claim 1, wherein the model is configured to identify features from the mesh data and the iLVFs to classify attributes of the mesh data and the iLVFs, the attributes being used for generating the oLVFs corresponding to the input mesh files.

12. The method of claim 1, wherein the human actor and the game character shares physical attributes.

13. The method of claim 1, wherein the game character is an avatar representing the human actor.

14. A method for generating label values for facial expressions of a game character using three-dimensional (3D) image capture, comprising:
accessing a model that is trained using inputs captured of multiple simulated characters using a virtual camera, the multiple simulated characters having different facial features or physical attributes;

the inputs captured additionally include input label value files (iLVFs) that are used to generate facial expressions of the multiple simulated characters;

the inputs further include mesh data of a face of the multiple simulated characters, the mesh data representing three-dimensional (3D) depth data of the face;

the model being trained by processing the iLVFs and the mesh data for the multiple simulated characters, the training of the model is configured to learn correspondences between the iLVFs and the mesh data;

capturing mesh files that include mesh data of a face of a human actor, the mesh files being provided as input queries to the model to generate one or more output label value files (oLVFs); and animating the facial expressions of the game character presented in a game processed by a game engine based at least on the one or more oLVFs.

15. The method of claim 14, wherein the iLVFs and mesh data is processed in time coordination such that correspondences between the iLVFs and the mesh data are learned by the model.

16. The method of claim 14, wherein the LVFs are used by the game engine to activate muscles on a face of the game character to generate the facial expressions of the game character.

17. The method of claim 14, wherein the iLVFs are used to instruct the simulated character to activate muscles on the face of the simulated characters to generate the facial expressions of the simulated characters.

18. The method of claim 14, wherein the oLVFs includes a plurality of values that correspond to features on the face of the human actor, said plurality of values being used for animating the facial expression of the game character.

19. The method of claim 18, wherein the plurality of values is configured to cause muscle activation in respective areas on the face of the game character.

20. The method of claim 14, wherein the model is configured to identify features from the mesh data and the iLVFs to classify attributes of the mesh data and the iLVFs, the attributes being used for generating the oLVFs corresponding to the captured mesh files.

21. The method of claim 14, wherein the human actor and the game character do not resemble one another.

22. The method of claim 14, wherein the human actor and the multiple simulated characters do not resemble one another.

* * * * *